United States Patent
Moyal et al.

(10) Patent No.: US 12,282,874 B2
(45) Date of Patent: Apr. 22, 2025

(54) SCHEDULING PROJECT ACTIVITIES USING TWIN COMPUTING SIMULATION

(71) Applicant: INTERNATIONAL BUSINESS MACHINES CORPORATION, Armonk, NY (US)

(72) Inventors: Shailendra Moyal, Pune (IN); Nitika Sharma, Zirakpur (IN); Sarbajit K. Rakshit, Kolkata (IN); Akash U. Dhoot, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 17/986,449

(22) Filed: Nov. 14, 2022

(65) Prior Publication Data

US 2024/0161032 A1  May 16, 2024

(51) Int. Cl.
*G06Q 10/0631* (2023.01)
*G06Q 10/0633* (2023.01)
*G06Q 10/067* (2023.01)

(52) U.S. Cl.
CPC ........... *G06Q 10/06312* (2013.01); *G06Q 10/063114* (2013.01); *G06Q 10/0633* (2013.01); *G06Q 10/067* (2013.01)

(58) Field of Classification Search
CPC ........................................ G06Q 10/00–50/00
USPC .................................. 705/7.11–7.42
See application file for complete search history.

(56) References Cited

U.S. PATENT DOCUMENTS

| | | | |
|---|---|---|---|
| 2005/0288986 A1 | 12/2005 | Barts et al. | |
| 2009/0112343 A1* | 4/2009 | Yuan | G05B 19/41865 700/115 |
| 2010/0184011 A1* | 7/2010 | Comerford | G10L 13/00 434/321 |
| 2014/0018951 A1* | 1/2014 | Linton | G06N 5/02 700/105 |
| 2014/0142998 A1* | 5/2014 | Kroeger | G06Q 10/06311 705/7.13 |
| 2019/0064790 A1* | 2/2019 | Yamamoto | G06Q 10/08 |
| 2021/0125035 A1* | 4/2021 | Wachira | G06N 3/08 |
| 2021/0287459 A1* | 9/2021 | Cella | G07C 5/0808 |

(Continued)

OTHER PUBLICATIONS

Liu, Qiang, et al. "Digital twin-based designing of the configuration, motion, control, and optimization model of a flow-type smart manufacturing system." Journal of Manufacturing Systems 58 (2021): 52-64. (Year: 2021).*

(Continued)

*Primary Examiner* — Alan S Miller
(74) *Attorney, Agent, or Firm* — Tutunjian & Bitetto, P.C.; Michael A. Petrocelli

(57) ABSTRACT

A critical path based proactive optimization that includes collecting data on the tasks of contextual situation for performing a process and training a twin computing simulation model using the collected data for each task in the process. A contextual situation simulation is run using the simulation models for each task in the process to determine a critical path that causes delay in the process. An optimized task is determined from the tasks of the contextual situation using machine learning employing the collected data, wherein the optimized task mitigates delay in the process from the critical path.

15 Claims, 6 Drawing Sheets

(56) References Cited

U.S. PATENT DOCUMENTS

2022/0083976 A1    3/2022   Rakshit et al.
2022/0342401 A1*  10/2022   Dunigan .......... G05B 19/41865
2023/0004149 A1*   1/2023   Dehghanimohammadabadi .........
                                                G05B 19/4188
2023/0115525 A1*   4/2023   Schneider ........ G05B 19/41885
                                                      705/7.22

OTHER PUBLICATIONS

Jost, Thomas Ernst, Christian Stary, and Richard Heininger. "Geo-spatial context provision for digital twin generation." Applied Sciences 12.21 (2022): 10988. (Year: 2022).*

Ambra, Tomas, An Caris, and Cathy Macharis. "The Digital Twin concept and its role in reducing uncertainty in synchromodal transport." Proceedings of the IPIC (2019). (Year: 2019).*

Lendermann et al., "Intitial Provisioning and Spare Parts Inventory Network Optimisation in a Multi Maintenance Base Environment", InProceedings of the 2012 Winter Simulation Conference (WSC) Dec. 9, 2012, pp. 1-10.

Frazzon et al., "Simulation-Based Analysis of Intelligent Maintenance Systems and Spare Parts Supply Chains Integration", Journal of Intelligent Systems, Nov. 6, 2016, pp. 1-12.

Disclosed Anonymously, "Intelligent Workflow for Synchronizing Transportation Delay with Industrial Machine Maintenance Prediction", An IP.com Prior Art Database Technical Disclosure, IP.com No. IPCOM000270242D, Jun. 20, 2022, 5 pages.

* cited by examiner

SCHEDULING PROJECT ACTIVITIES USING TWIN COMPUTING SIMULATION

BACKGROUND

The present invention generally relates to computer modeling, and more particularly to resource utilization algorithms for scheduling a set of project activities.

Critical path method (CPM) is a resource-utilization algorithm for scheduling a set of project activities. The essential technique for using CPM is to contract a model of the project that includes: (1) a list of all the tasks required to complete the task; (2) the dependencies between the tasks; and (3) the estimated of time (duration) that each activity will take to complete. With this information, you can determine the critical path by identifying the longest stretch of dependent activities, and measuring them from start to finish. Once you have identified which activities are on the longest, or the critical path, you can more easily discern which have total float, or can be delayed without making the project longer.

Transportation vehicles are carrying different types of spare part from various manufacturing units located in different locations to various assembling units spread across various locations. For various reasons, the assembling rate may not be synchronized with the delivery of the parts to the sites for assembly. One shortage of a spare part can delay an entire assembly line.

SUMMARY

In accordance with a first aspect of the present invention, a computer implemented method is provided for critical path based proactive optimization. In one embodiment, the computer implemented method can include collecting data on the tasks of contextual situation for performing a process. Training a twin computing simulation model using the collected data for each task in the process. Running a contextual situation simulation using the simulation models for each task in the process to determine a critical path that causes delay in the process. Determining an optimized task from the tasks of the contextual situation using machine learning employing the collected data, wherein the optimized task mitigate delay in the process from the critical path.

In accordance with a second aspect of the present invention, a system is described for critical path based proactive optimization. In one embodiment, the system includes a hardware processor; and a memory that stores a computer program product. The computer program product when executed by the hardware processor, causes the hardware processor to collect data on tasks of a contextual situation for performing a process. The computer program product can also cause the hardware processor to train a twin computing simulation model using the collected data for each task in the process, and run a contextual situation simulation using the simulation models for each task in the process to determine a critical path that causes delay in the process. The computer program product can also cause the hardware processor to determine an optimized task from the tasks of the contextual situation using machine learning employing the collected data, wherein the optimized task mitigate delay in the process from the critical path.

In accordance with yet another aspect of the present invention, a computer program product is described for critical path based proactive optimization. In one embodiment, the computer program product includes a computer readable storage medium having computer readable program code embodied therewith, the program instructions executable by a processor to cause the processor to collect, using the processor, data on tasks of a contextual situation for performing a process. The computer program product can also train, using the processor, a twin computing simulation model using the collected data for each task in the process, and run, using the processor, a contextual situation simulation using the simulation models for each task in the process to determine a critical path that causes delay in the process. The computer program product can also determine, using the processor, an optimized task from the tasks of the contextual situation using machine learning employing the collected data, wherein the optimized task mitigate delay in the process from the critical path.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
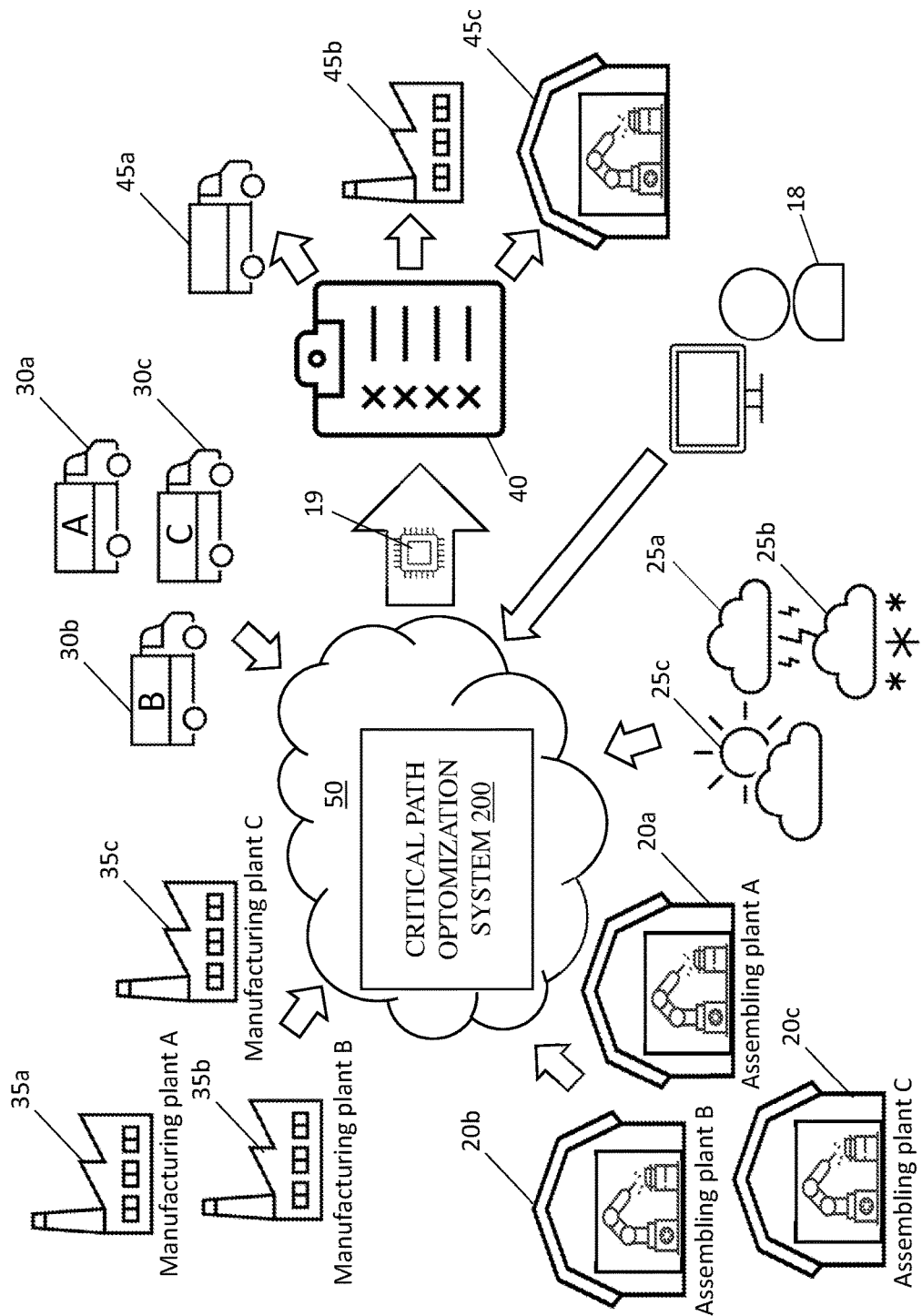
FIG. 1 is an illustration of an environment illustrating an application for the simulated critical path based proactive optimization, in accordance with one embodiment of the present disclosure.

In some embodiments, the methods, systems and computer program products that are described herein can provide a simulated critical path for proactive optimization. Critical path method (CPM) is a resource-utilization algorithm for scheduling a set of project activities. The essential technique for using CPM is to construct a model of the project that includes (1) a list of all the tasks required to complete the task; (2) the dependencies between the tasks; and (3) the estimated of time (duration) that each activity will take to complete. With this information, you can determine the critical path by identifying the longest stretch of dependent activities, and measuring them from start to finish. Once you have identified which activities are on the longest, or the critical path, you can more easily discern which have total float, or can be delayed without making the project longer.

Because of various contextual situations, one or more spare parts, logistic (like weather can influence transportation), actual capacity of the assembling machine can become critical, and because of changes of such, the assembling can be impacted in any assembling shop. Under these conditions, it can be best to simulate an entire contextual situation to identify which parameter is critical path and proactive mitigation by the transportation vehicles. For example, the critical path can be, one or more spare parts (like worldwide chip shortage). In another example, the critical path can be a transportation route. In an even further example, the critical path can be a labor strike, road condition, and/or weather condition etc.

Because of various contextual situations, one or more spare parts, logistic challenges (such as how weather can influence transportation), and actual capacity of assembling machines can each be an element that impacts production. Because of changes of such, the assembling can be impacted in any assembling location. In light of multi-location assembly locations, it has been determined that in order to identify which parameter is the critical path and to provide for proactive mitigation by the transportation vehicles, it can be advantageous to simulate the entire contextual situation. For example, the critical path can be, one or more spare parts (like worldwide chip shortage), transportation route, labor strike, road condition, weather condition etc.

As will be described in further details below, one aspect of the methods, systems and computer program products that are described herein that can provide a simulated critical path for proactive optimization includes a cloud hosted integrated digital twin simulation system. The cloud hosted integrated twin computation system can simulate various driving factors. One driving factor is the manufacturing machines, e.g., manufacturing machines of the different plants. The manufacturing machines are where spare parts are manufactured. A second driving factor are assembling machines of different manufacturing units. Assembling machines (where different spare parts are assembled) of different manufacturing units, Transportation vehicles (spare parts transportation, raw material transportation) etc.) with respect to weather condition, route condition etc. to identify the critical path and accordingly the transportation and delivery system (Spare parts, Raw materials) will proactively be arranging the transportation to address the identified critical path and ensure maximized throughput.

In some embodiments, the methods, systems and computer program products that are described herein consider based on simulated results can identify the critical path and can determine the timing at which the critical path arrives. Using this information, the methods, systems and computer program products can proactively mitigate situations involving a lack of spare parts or lack of inventory for spare parts.

In some embodiments, the methods, systems and computer program products that are described herein can consider, based on the identified critical path scenario, how both the manufacturing unit and/or assembling units can be proactively performing maintenance of respective machines, upgradation of machines so that proper mitigation can be taken based on the identified critical path scenario.

In some embodiments, the methods, systems and computer program products that are described herein can based on derived critical path and parameters influencing critical path, proactively suggests transportation system to carry additional needed logistics to minimize the impact.

In some embodiments, autonomous delivery and autonomous transportation systems can load the transportation vehicles and will be selecting appropriate manufacturing unit or assembling unit to meet the demands of the identified critical path. Any parameter can be addressed proactively with the management of transportation system.

In some embodiments, the autonomous transportation system will proactively be initiating transportation of the spare parts if the simulation engine identifies the logistic to become critical path for the throughput of the products.

Referring now to the drawings in which like numerals represent the same or similar elements, the methods, systems and computer program products for providing a simulated critical path based proactive optimization are now described in greater detail with reference to FIGS. 1-6.

Figure 2:
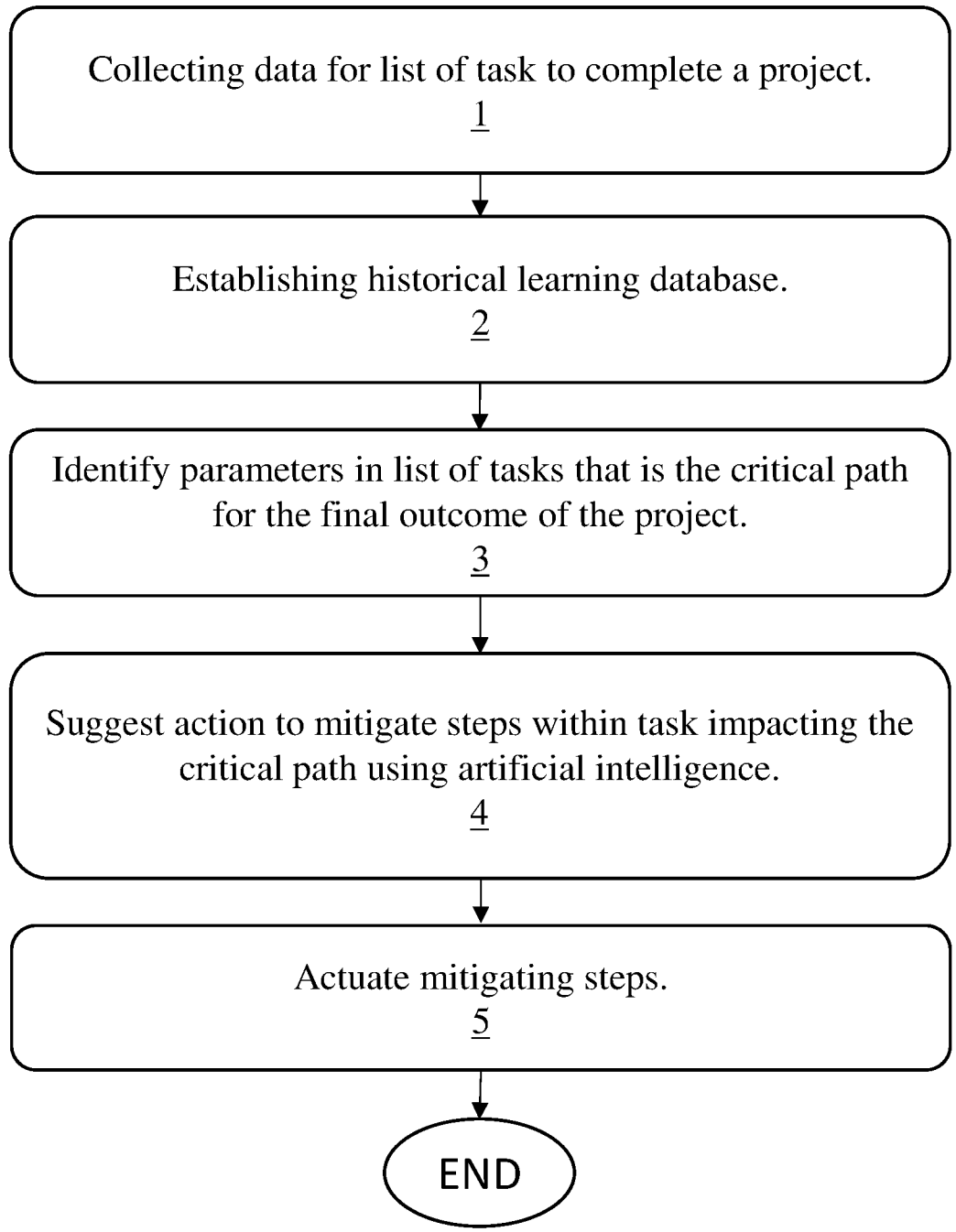
FIG. 2 illustrates one embodiment of a flow chart for a simulated critical path based proactive optimization, in accordance with one embodiment of the present disclosure.
Figure 3:
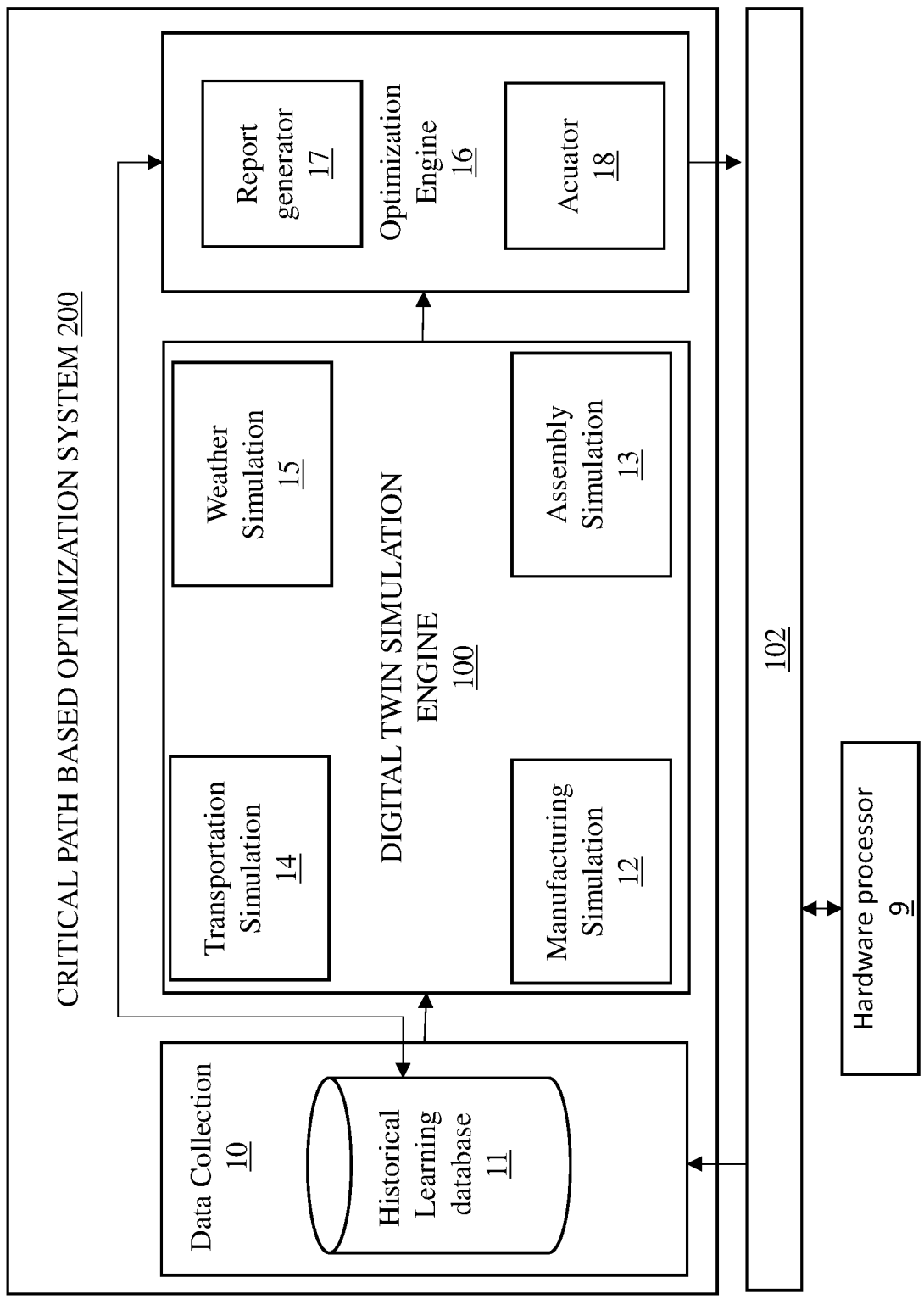
FIG. 3 is a flow chart/block diagram illustrating a system for simulated critical path based proactive optimization, in accordance with one embodiment of the present disclosure.

FIG. 1 is an illustration of an environment illustrating an application for the simulated critical path based proactive optimization to a manufacturing orientated operation. FIG. 2 illustrates one embodiment of a flow chart for a method that provides a simulated critical path based proactive optimization, in accordance with one embodiment of the present disclosure. FIG. 3 is a block diagram illustrating a system for simulated critical path based proactive optimization.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates one embodiment of an application for a method and system for simulated critical path based on proactive optimization. FIG. 1 illustrates one embodiment of an assembling components from parts, e.g., spare parts. In the embodiment that is depicted in FIG. 1, because of various contextual situations, one or more spare parts, logistics (like weather can influence transportation), actual assembly of the assembly machine can become critical, and so we need to stimulate the entire contextual situation to identify which parameter is the critical path.

Critical path method (CPM) is a resource-utilization algorithm for scheduling a set of project activities. The essential technique for using CPM is to construct a model of the project that includes (1) a list of all the tasks required to complete the task; (2) the dependencies between the tasks; and (3) the estimated of time (duration) that each activity will take to complete. With this information, you can determine the critical path by identifying the longest stretch of dependent activities, and measuring them from start to finish. Once you have identified which activities are on the longest, or the critical path, you can more easily discern which have total float, or can be delayed without making the project longer.

In one example, the product being assembled can be a motor vehicle, and the component that provides the critical path can be a semiconductor. For example, when the stock of semiconductors is too low the number of vehicles being assembled will have to stop. The critical path for a component in the assembly process can be, one or more spare parts (like worldwide chip shortage 51), transportation route, labor strike, road condition, weather condition etc.

FIG. 1 illustrates one example of an entire contextual situation to identify which parameter is the critical path. The contextual situation may include manufacturing machines 35a, 35b, 35c of different plants, assembling machines 20a, 20b, 20c of different manufacturing units, and transportation vehicles 30a, 30b, 30c. The manufacturing machines 35a, 35b, 35c are where the parts are manufactured. The assembling machines 25a, 25b, 25c are where the parts of assembled. The transportation vehicles 30a, 30b, 30c provide for transportation of the parts, e.g., spare parts, and raw material transportation. It is noted in the environment depicted in FIG. 1 there are three manufacturing machines 35a, 35b, 35c, and there are three assembly machines 20a, 20b, 20c, as well as three different transportation vehicles 30a, 30b, 30c. This is only one example of the present disclosure, and it is not intended to be limited to only this example, any number of these elements may be integrated into a contextual situation to identify which parameter is the critical path.

Still referring to FIG. 1, using the contextual situation depicted, a digital twin computation simulation engine 100 of a critical path optimization system 200 is used for simulating how the contextual situation illustrated in the supplied figure. The digital twin computing simulation engine 100 is a virtual representation of an object or system that spans its lifecycle, is updated from real-time data, and uses simulation, machine learning and reasoning to help decision-making. The digital twin computing simulation engine 100 can simulate the ecosystem through which manufacturing is being accomplished, as illustrated in FIG. 1. The simulated elements of the ecosystem that is provided by the digital twin computing simulation system 100 can include simulations for the manufacturing machines, simulations for the assembling machines, and simulations for the transportation vehicles. In some embodiments, with respect to weather conditions 25a, 25b, 25c, route condition etc. to identify the critical path and accordingly the transportation and delivery system (Spare parts, Raw materials) will proactively be arranging the transportation to address the identified critical path and ensure maximized throughput.

Referring to FIG. 1, the critical path optimization system 200 that includes digital twin computing simulation engine 100 may be an element of a distributed computing environment. A distributed system is a computing environment in which various components are spread across multiple computers (or other computing devices) on a network. These devices split up the work, coordinating their efforts to complete the job more efficiently than if a single device had been responsible for the task. In some embodiments, the digital twin computing simulation system 100 is cloud based 50. A cloud based system, often known as cloud computing, is a broad term for anything that involves the delivery of hosted services via the internet.

Based on simulated results, the critical path optimization system 200 that includes digital twin computing simulation engine 100 can identify the critical path. In the example identified in FIG. 1, the critical path is the unavailability of stock of semiconductor chips 19. The critical path optimization system 200 that includes digital twin computing simulation engine 100 can identify when the critical path situation will be arrived (as indicated in a report 40), and accordingly the proposed delivery and transportation system 45a will proactively be mitigating the situation as per the identified critical path.

The critical path optimization system may further including an optimization engine 16, which can use artificial intelligence to select mitigating steps to resolve any delays resulting from the critical path simulated by the twin computing simulation engine 100. The optimization engine 16 can issue reports 40 illustrating the mitigating steps, as well as actuate optimizations of the elements within the contextual situation. For example, to mitigate the critical path, an optimized manufacturing unit 45b may be selected. The optimized manufacturing unit 45b may be the manufacturing unit having the highest throughput from the grouping of manufacturing units 35a, 35b, 35c. In another example, to mitigate the critical path, an optimized assembly unit 45c may be selected. The optimized manufacturing unit 45b may be the manufacturing unit having the highest throughput from the grouping of manufacturing units 35a, 35b, 35c. In another example, to mitigate the critical path, an optimized transportation unit 45a may be selected. The optimized transportation unit 45a may be the manufacturing unit having the highest throughput from the grouping of transportation units 30a, 30b, 30c.

In some embodiments, autonomous delivery and autonomous transportation system can load the transportation vehicles 45a and will be selecting appropriate manufacturing unit 45b or assembling unit 45c so that identified critical path because of any parameter can be addressed proactively with the management of transportation system 45a.

In some embodiments, based on the identified critical path scenario, both the manufacturing unit 45b and/or assembling units 45a will proactively be performing maintenance of respective machines, upgradation of machines so that proper mitigation can be taken based on the identified critical path scenario.

In some embodiments, the autonomous transportation system 45a will proactively be initiating transportation of the spare parts if the simulation engine identifies the logistic to become critical path for the throughput of the products.

In some embodiments, the critical path optimization system 200 will adapt to changes into any critical path parameter to adjust the initiated actions to different critical path destination recommended because of collaborating with multiple integral simulation systems.

In some embodiments, the critical path optimization system 200 will also make use of activity information to predict changes into critical path units as spare part, assembly part etc to recommend more accessories to be included with priority spare parts in critical path.

In some embodiments, the critical path optimization system 200 is based on derived critical path and parameters influencing critical path, and proactively suggests transportation system to carry additional needed logistics to minimize the impact.

In some embodiments, the critical path optimization system 200 can build and update a historical corpus data to keep the mapping of derived critical path, its relative mitigation, and the outcome/impact score after applying mitigation.

In some embodiments, the critical path optimization system 200 further uses this historical learning and suggest, or course correct considering the past outcome for the same or similar kind of critical path scenarios.

Still referring to FIG. 1, in some embodiments, while simulating the critical path, the critical path optimization system 200 can receive predicted aggregated demand from various customers 18. This provides that the process can be tailored to the needs of customers 18 when making their order, and also provides for real time revisions to orders. The simulations can be adjusted to take into account order details based on the aggregate demand from customers 18.

FIG. 2 illustrates one embodiment of a computer implemented method for a simulated critical path based proactive optimization for a process. Critical path method (CPM) is a resource-utilization algorithm for scheduling a set of project activities. The essential technique for using CPM is to contract a model of the project that includes: (1) a list of all the tasks required to complete the task; (2) the dependencies between the tasks; and (3) the estimated of time (duration) that each activity will take to complete. With this information, you can determine the critical path by identifying the longest stretch of dependent activities, and measuring them from start to finish. Once you have identified which activities are on the longest, or the critical path, you can more easily discern which have total float, or can be delayed without making the project longer.

Blocks 1 and 2 of the method depicted in FIG. 2 includes collecting data for list of task to complete a project, and establishing a historical learning database. This involves collection of data for creating the simulation, e.g., (1) list of tasks, (2) dependency of tasks, and (3) estimated time for tasks to complete. This list may be created from data entry during programming. Additionally, the data may be provided by collecting readings from sensors applied to elements of the environment to be simulated, e.g., GPS sensors/timers attached to transportation vehicles 30a, 30b, 30c. Another example are counters and timers measuring throughput are those that may be included on the assembly machines 20a, 20b, 20c, as well as the manufacturing machines 35a, 35b, 35c. Data may also be collected on the weather 25a, 25b, 25c. This data may be collected from public information databases. Further, data can be collected using a web crawler. For example, in addition to data specific to the weather, the data can be collected that impact the routes via which the transportation systems, e.g., transportation vehicles 30a, 30b, 30c, travel. Data of this type may include traffic data, as well as disruptions to roads and passageways resulting from construction, and/or road closures, etc. This type of data can be collected from social media data, as well as transportations system to identify road condition etc.

In addition to the original data used to create the simulations, prior outputs of the simulations for the simulated critical path based proactive optimization may be stored in the historical learning database. FIG. 3 is a block diagram illustrating a system 200 for simulated critical path based proactive optimization. The system 200 may include a data collection engine 10 for collecting and storing data as described in step 1 of the method illustrated in FIG. 2. The data collection engine 10 may be an interface for data entry, e.g., where an operator is providing the data to the system 200, e.g., through text based data entry. The data collection engine 10 may also include a web crawler for collecting internet based data. The data collection engine 10 may also include memory for storing the prior outputs of the simulations for the simulated critical path based proactive optimization may be stored in the historical learning database.

Referring back to FIG. 2, in some embodiments, the computer implemented method may include establishing a historical learning database at block 2. Referring to FIG. 3, in some embodiments, the data collection engine 10 includes memory for storing the prior outputs of the simulations for the simulated critical path based proactive optimization may be stored in the historical learning database may be provide by a historical learning database 11, as illustrated in FIG. 3.

The computer implemented method can further include identify parameters in list of tasks that is the critical path for the final outcome of the project at block 3 of the method illustrated in FIG. 2. The critical path is determined using a digital twin computing simulation engine 100, as illustrated in the system 200 for simulated critical path based proactive optimization.

The digital twin computing simulation engine 100 can be connected to each of the manufacturing units 20a, 20b, 20c, and assembling units 35a, 35b, 35c. The connection may be wireless and via a could based interface. For example, the connection may be over the data collection engine 10 depicted in FIG. 3. The digital twin computing simulation engine 100 can gather data to provide digital twin simulation models of each of the machines in the manufacturing units 20a, 20b, 20c and assembling units 35a, 35b, 35c. Based on the data collected, the digital twin computing simulation engine 100 can calculate the actual capacity of different plants 20a, 20b, 20c, and assembling units 35a, 35b, 35c. The digital twin computing simulation engine 100 can also identify the actual manufacturing capacity of different spare parts and final products from different assembling units 35a, 35b, 35c. From simulating capacity, the digital twin computing simulation engine 100 can determine what plant capacity is the maximum capacity.

The integrated digital twin computing simulation system 100 can identify the model of the transportation vehicles 30a, 30b, 30c, and from the data collected on the weather and routes can simulate performance of the transportation vehicles 30a, 30b, 30c in delivering raw materials, parts and finalized products, as part of a production cycle. As noted the system 200 gathers social media data, weather information, and data from transportation systems to identify road conditions etc.

Referring to FIG. 3, the digital twin computing simulation engine 100 may include multiple simulation modules. For example, the integrated digital twin computing simulation system 100 may include a module for the assembly simulation 12. The module for the assembly simulation 12 can provide a simulation of the performance of the assembling units 20*a*, 20*b*, 20*c*. For example, the integrated digital twin computing simulation system 100 may include a module for the manufacturing simulation 13. The module for the manufacturing simulation 13 can provide a simulation of the performance of the manufacturing units 35*a*, 35*b*, 35*c*. The module for the transportation simulation 14 can provide a simulation of the performance of the delivery vehicles 30*a*, 30*b*, 30*c*. The module for the weather simulation 15 can provide a simulation of the weather, and how that weather can impact the performance of the delivery vehicles 30*a*, 30*b*, 30*c* impact the performance of the manufacturing units 20*a*, 20*b*, 20*c*, and/or impact the performance of the assembly 20*a*, 20*b*, 20*c*. It is noted that the integrated digital twin computing system 100 that is depicted in FIG. 3 is not limited to only the simulation modules described above. Any elements of a process can be simulated, and applied to the entire scenario for simulating the entire situation by which to identify the critical path.

The simulation provides by the modules, i.e., module for the assembly simulation 12, module for the manufacturing simulation 13, module for the transportation simulation 14 and module for the weather simulation 15, can each be provided using artificial intelligence. For example, an artificial neural network (ANN) may be suitable for this purpose of providing a module for simulation, e.g., module for the assembly simulation 12, module for the manufacturing simulation 13, module for the transportation simulation 14 and module for the weather simulation 15, can each be provided using artificial intelligence.

An artificial neural network (ANN) is an information processing system that is inspired by biological nervous systems, such as the brain. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 4:
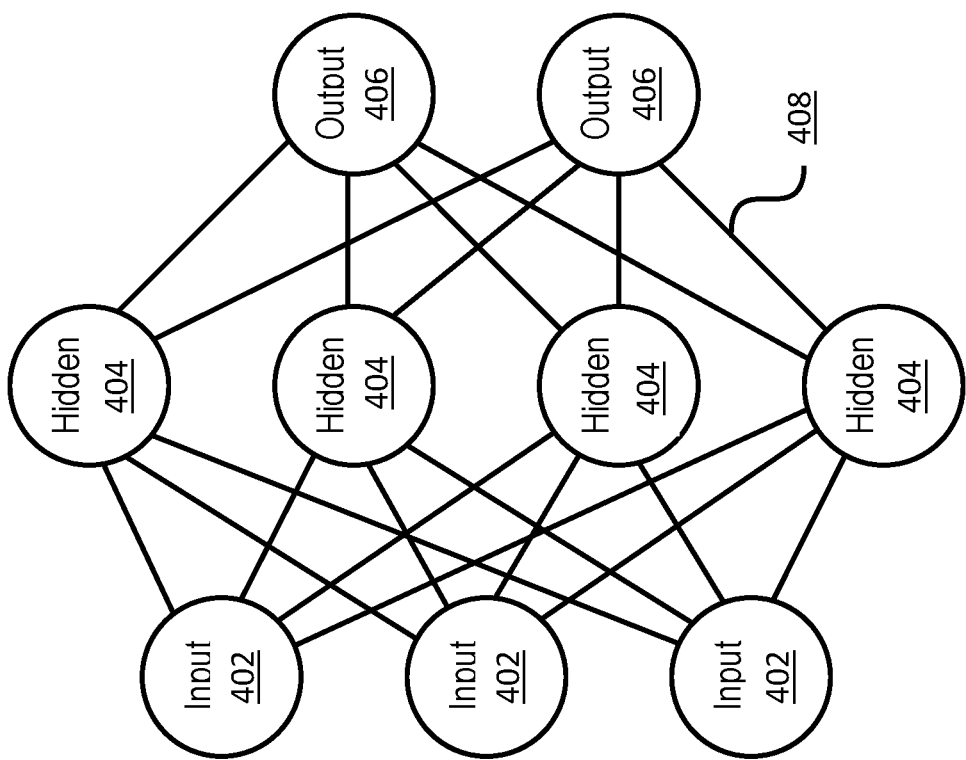
FIG. 4 is a generalized diagram of a neural network, in accordance with one embodiment of the present disclosure.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 402 that provide information to one or more "hidden" neurons 404. Connections 408 between the input neurons 402 and hidden neurons 404 are weighted, and these weighted inputs are then processed by the hidden neurons 404 according to some function in the hidden neurons 404. There can be any number of layers of hidden neurons 404, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 406 accepts and processes weighted input from the last set of hidden neurons 404.

This represents a "feed-forward" computation, where information propagates from input neurons 402 to the output neurons 406. Upon completion of a feed-forward computation, the output is compared to a desired output available from training data. The error relative to the training data is then processed in "backpropagation" computation, where the hidden neurons 404 and input neurons 402 receive information regarding the error propagating backward from the output neurons 406. Once the backward error propagation has been completed, weight updates are performed, with the weighted connections 408 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. The training data can be provided by the data that is stored in the historical training database. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 408 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 408 may be implemented as resistive processing units (RPUs), generating a predictable current output when an input voltage is applied in accordance with a settable resistance.

Using data collected at block 1, the integrated digital twin computing system 100 can run simulations for an entire context of a situation. The integrated digital computing system 100 provides a simulation for the entire context by having multiple simulations for each element within the situation, e.g., delivery vehicles 30*a*, 30*b*, 30*c*, manufacturing units 35*a*, 35*b*, 35*c*, and the assembly units 20*a*, 20*b*, 20*c*. In some embodiments, the integrated digital twin computing system 100 will be simulating entire situation to identify how the critical path. The critical path is the element that can causes delays in the process.

In some embodiments, while simulating the critical path, the integrated digital twin computing system 100 can receive predicted aggregated demand from various customers 18. Aggregate demand for the customers may be one element of data received during the data collection stage of the method that is described with reference to block 2. The interface for customer orders to be received by the critical path optimization system 200 can be the data collection engine 10 that is depicted in FIG. 3.

The digital twin computing simulation system 100 of the critical path optimization system 200 can identifying which parameter can become critical path and when such critical path situation will be arrived for those parameters. In some embodiments, when one or more parameters become critical path this can result in the throughput being reduced. Different critical path parameters can be, reduction of one or more types of spare parts, delivery delay of raw material spare parts, weather condition etc.

At block 3 of the computer implemented method, the critical path optimization system 200 can identify parameters in list of tasks that is the critical path for the final outcome of the project. Turning to block 4 of the method illustrated in FIG. 2, once the critical path has been determined, the digital twin computing simulation engine 100 can identifying how the critical path parameter can be changed.

Block 4 of the computer implemented illustrated in FIG. 2 can include to suggest an action to mitigate steps within task impacting the critical path using artificial intelligence, e.g., machine learning. In some embodiments, the changing of critical path parameters means, further optimizing end to end process to maintain the throughput. Referring to FIG. 3, the artificial intelligence for suggesting mitigating tasks may include an optimization engine 16, which may include a neural network, as described above with reference to FIG. 4. As described above, the critical path optimization system 200 includes a data collection engine 10. The data collection engine 10 maintains a database, e.g., historical learning database 11, that includes prior measurements of critical paths, as well as a record of prior mitigating steps. That data may be used to train the artificial intelligence, e.g., neural network, to make mitigation suggestions in response to the critical paths determined by the simulations. It is noted that the neural network is only one example of the type of artificial intelligence that can be employed by the optimization engine 16. It is noted that any type of machine learning is applicable. Machine learning (ML) employs statistical techniques to give computer systems the ability to "learn" (e.g., progressively improve performance on a specific task) with data, without being explicitly programmed. The machine learning method that can be used to suggestion mitigating steps in response to critical paths can employ decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof.

In some embodiments, the image analyzer can analyze pin layouts using a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

It is noted that the above examples of algorithms used for machine learning (ML)/artificial intelligence have been provided for illustrative purposes only.

In some embodiments, to suggest an action to mitigate steps within tasks impacting the critical path, the optimization engine 16 may include a report generator 17. Referring to FIG. 1, the report generator 17 can produce a report 40 identifying optimizations.

Referring to FIG. 2, in some embodiments, the computer implemented method can actuate the mitigating steps that were calculated by the optimization engine 16 at block 5. For example, the critical path optimization system 200 may be in communication via internet based communications with the manufacturing machines of the manufacturing units 35*a*, 35*b*, 35*c*, the assembly machines of the assembly units 20*a*, 20*b*, 20*c* and the delivery vehicles 30*a*, 30*b*, 30*c*. The machines and vehicles can operate autonomously in response to the commands provided by the critical path optimization system 200. Referring to FIG. 3, the optimization engine 16 may include an actuator 18 for issuing these commands to the autonomous elements of the manufacturing machines of the manufacturing units 35*a*, 35*b*, 35*c*, the assembly machines of the assembly units 20*a*, 20*b*, 20*c* and the delivery vehicles 30*a*, 30*b*, 30*c*. The autonomous elements may include servos and motors that are actuated in response to commands from the actuator 18 for carrying out the mitigating steps of the optimization engine 16. The optimized machines and vehicles are identified in reference numbers 45*a*, 45*b*, 45 in FIG. 1. These optimized elements represent the selections that can mitigate delays in the critical path.

For example, if the digital twin computing simulation system 100 simulates the spare part manufacturing, e.g., manufacturing machines 35*a*, 35*b*, 35*c*, will be critical path, because of problem with machine, then the optimization engine 16 will proactively be notifying which machine needs maintenance or installing additional machines or running the machines in multiple shifts, etc. This is just one example of how the optimization engine 16 can create end to end plans to identify how the critical path scenario can be mitigated. In other examples, the digital twin computing simulation engine 100 and the optimization engine 16 of the critical path optimization system 200 can identify if the transportation will become a critical path, and can proactively initiate appropriate transportation system so that the critical path situation can be addressed. The proposed autonomous transportations system will proactively be scheduling the transportation vehicles so that critical path scenario for the identified parameters can be mitigated.

Figure 5:
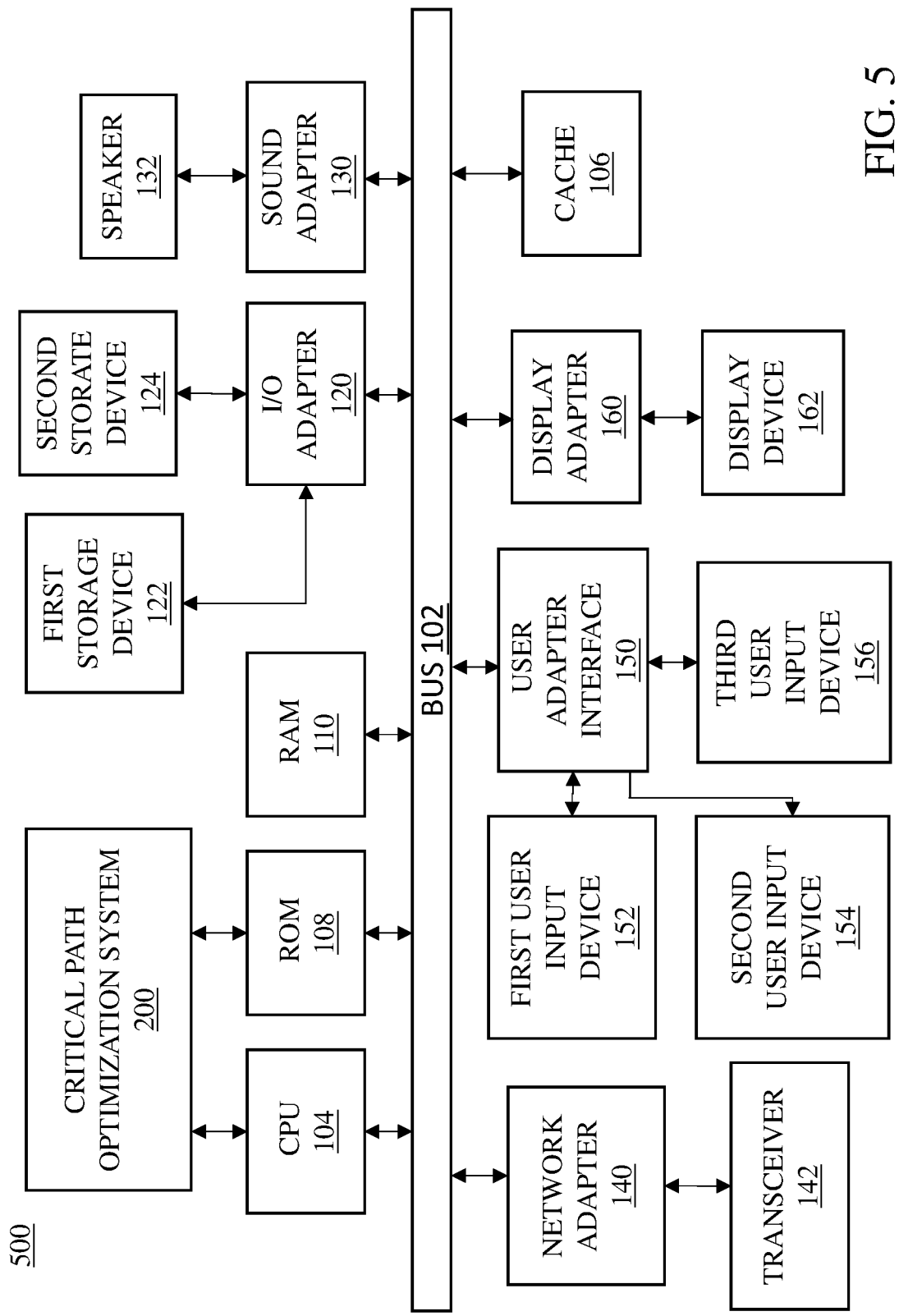
FIG. 5 is a block diagram illustrating a system that can incorporate the system for critical path based optimization, that are depicted in FIG. 2, in accordance with one embodiment of the present disclosure.

Referring to FIG. 3, in some embodiments, the components of the system 200 are interconnected by a bus 102. The bus 102 may also be in communication with at least one hardware processor, in which the hardware processor 9 may function with the other elements depicted in FIG. 3 to provide the functions described above. FIG. 5 further illustrates a processing system 500 that can include the critical path optimization system 200 described with reference to FIGS. 1-3. The exemplary processing system 500 to which the present invention may be applied is shown in accordance with one embodiment. The processing system 500 includes at least one processor (CPU) 104 operatively coupled to other components via a system bus 102. The system bus 102 may be in communication with the system for critical path based optimization. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that provides for provenance based identification of policy deviations in cloud environments can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 500 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. For example, in some embodiments, a computer program product is provided for critical path based optimization. The computer program product can include a computer readable storage medium having computer readable program code embodied therewith. The program instructions are executable by a processor. The program instructions are executable by a processor to cause the processor to collect, using the processor, data on tasks of a contextual situation for performing a process. The computer program product can also train, using the processor, a twin computing simulation model using the collected data for each task in the process, and run, using the processor, a contextual situation simulation using the simulation models for each task in the process to determine a critical path that causes delay in the process. The computer program product can also determine, using the processor, an optimized task from the tasks of the contextual situation using machine learning employing the collected data, wherein the optimized task mitigate delay in the process from the critical path.

The computer program product may include a computer readable storage medium (or media) having computer readable program instructions thereon for causing a processor to carry out aspects of the present invention. The computer program produce may also be non-transitory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
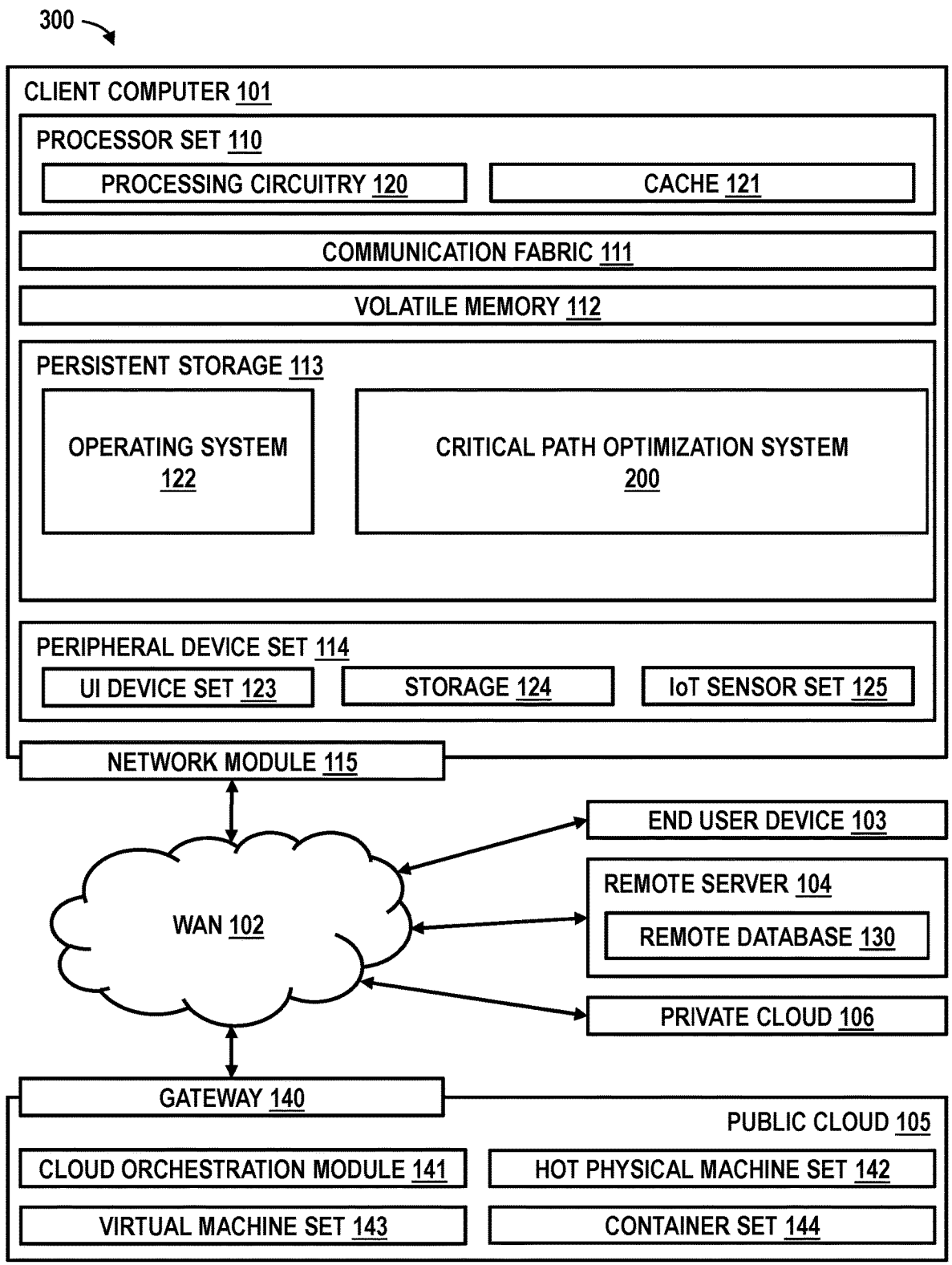
FIG. 6 depicts a computing environment according to an embodiment of the present disclosure.

Referring to FIG. 6, the computing environment 300 contains an example of an environment for the execution of at least some of the computer code involved in performing the inventive methods, such as the method for critical path optimization 200. In addition to block 200, computing environment 300 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 200, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 501, to keep the presentation as simple as possible.

Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 300, at least some of the instructions for performing the inventive methods may be stored in block 200 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 101 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 101 to communicate with other computers through WAN 102. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515. WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for critical path based optimization (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for critical path based proactive optimization comprising:
receiving data, at a computer, on tasks of a contextual situation for performing a process;

training a twin computing simulation model using the collected data for each task in the process;

running a contextual situation simulation using the simulation models for each task in the process to determine a critical path that causes delay in the process;

determining an optimized task from the tasks of the contextual situation using machine learning employing the collected data, wherein the optimized task mitigates delay in the process from the critical path; and actuating the optimized task, wherein the actuating the optimized task comprises at least one of actuating autonomous manufacturing machines, actuating autonomous assembly machines, actuating autonomous vehicles or a combination thereof.

2. The computer implemented method of claim 1, wherein said each task comprises manufacturing using manufacturing machines for parts, assembling using assembling machines for parts and transportation of parts using transportation vehicles.

3. The computer implemented method of claim 1, wherein said collecting data comprises recording sensor readings from transport vehicles, recording sensor readings from actuators in manufacturing equipment, recording from public data transportation route characteristics, recording from public data weather information or a combination thereof.

4. The computer implemented method of claim 1, wherein the simulation models include a simulation for manufacturing machines, a simulation for assembling machines and a simulation for the transportation of vehicles, which are each run to contribute to the contextual situation simulation, wherein at least one of the manufacturing machines, assembling machines, or transportation of vehicles is determined to result in the delay in the process that is the critical path.

5. The computer implemented method of claim 1, further comprising storing a historical learning database, wherein the historical learning database includes historical solutions for mitigating historical critical paths.

6. The computer implemented method of claim 5, wherein machine learning applies the data collected to the critical path and the historical solutions to determine the optimized task.

7. A system for critical path based proactive optimization comprising:

a hardware processor; and a memory that stores a computer program product, the computer program product when executed by the hardware processor, causes the hardware processor to:

collect data on the tasks of contextual situation for performing a process;

train a twin computing simulation model using the collected data for each task in the process;

run a contextual situation simulation using the simulation models for each task in the process to determine a critical path that causes delay in the process;

determine an optimized task from the tasks of the contextual situation using machine learning employing the collected data, wherein the optimized task mitigates delay in the process from the critical path; and actuate the optimized task, wherein actuating the optimized task comprises at least one of actuating autonomous manufacturing machines, actuating autonomous assembly machines, actuating autonomous vehicles or a combination thereof.

8. The system of claim 7, wherein said each task comprises manufacturing using manufacturing machines for parts, assembling using assembling machines for parts and transportation of parts using transportation vehicles.

9. The system of claim 7, wherein the simulation models include a simulation for manufacturing machines, a simulation for assembling machines and a simulation for transportation of vehicles, which are each run to contribute to the contextual situation simulation, wherein at least one of the manufacturing machines, assembling machines, or transportation of vehicles is determined to result in the delay in the process that is the critical path.

10. The system of claim 7, further comprising storing a historical learning database, wherein the historical learning database includes historical solutions for mitigating historical critical paths.

11. The system of claim 10, wherein machine learning applies the data collected to the critical path and the historical solutions to determine the optimized task.

12. A computer program product for critical path based proactive optimization, the computer program product including a computer readable storage medium having computer readable program code embodied therewith, the program instructions executable by a processor to cause the processor to:

collect, using the processor, data on the tasks of contextual situation for performing a process; train, using the processor, a twin computing simulation model using the collected data for each task in the process;

run, using the processor, a contextual situation simulation using the simulation models for each task in the process to determine a critical path that causes delay in the process;

determine, using the processor, an optimized task from the tasks of the contextual situation using machine learning employing the collected data, wherein the optimized task mitigates delay in the process from the critical path; and actuate, using the processor, the optimized task, wherein actuating the optimized task comprises at least one of actuating autonomous manufacturing machines, actuating autonomous assembly machines, actuating autonomous vehicles or a combination thereof.

13. The computer program product of claim 12, wherein said each task comprises manufacturing using manufacturing machines for parts, assembling using assembling machines for parts and transportation of parts using transportation vehicles.

14. The computer program product of claim 12, wherein the simulation models include a simulation for manufacturing machines, a simulation for assembling machines and a simulation for transportation of vehicles, which are each run to contribute to the contextual situation simulation, wherein at least one of the manufacturing machines, assembling machines, or transportation of vehicles is determined to result in the delay in the process that is the critical path.

15. The computer program product of claim 12, wherein the collecting data comprises storing a historical learning database, wherein the historical learning database includes historical solutions for mitigating historical critical paths.

* * * * *